United States Patent
Kadjo et al.

(10) Patent No.: US 12,474,310 B2
(45) Date of Patent: Nov. 18, 2025

(54) SUPPRESSOR DIAGNOSTIC TOOL

(71) Applicant: DIONEX CORPORATION, Sunnyvale, CA (US)

(72) Inventors: Akinde F. Kadjo, Palo Alto, CA (US); Rong Lin, Fountain Valley, CA (US)

(73) Assignee: Dionex Corporation, Sunnyvale, CA (US)

( * ) Notice: Subject to any disclaimer, the term of this patent is extended or adjusted under 35 U.S.C. 154(b) by 443 days.

(21) Appl. No.: 18/060,542

(22) Filed: Nov. 30, 2022

(65) Prior Publication Data

US 2024/0175851 A1 May 30, 2024

(51) Int. Cl.
G01N 30/86 (2006.01)
B01D 15/36 (2006.01)
G01N 30/72 (2006.01)

(52) U.S. Cl.
CPC ....... G01N 30/8637 (2013.01); B01D 15/367 (2013.01); G01N 30/72 (2013.01)

(58) Field of Classification Search
None
See application file for complete search history.

(56) References Cited

U.S. PATENT DOCUMENTS

| | | | | |
|---|---|---|---|---|
| 4,999,098 A * | 3/1991 | Pohl | ........................ | G01N 30/84 204/522 |
| 5,248,426 A * | 9/1993 | Stillian | ................... | G01N 30/96 210/659 |
| 5,417,853 A * | 5/1995 | Mizuno | ................ | G01N 33/723 210/143 |
| 5,804,142 A * | 9/1998 | Ito | .......................... | G01N 30/88 700/273 |
| 6,544,484 B1 * | 4/2003 | Kaufman | .............. | H01J 49/168 422/186.04 |
| 6,568,245 B2 | 5/2003 | Kaufman | | |
| 2009/0218238 A1 | 9/2009 | Dasgupta et al. | | |
| 2011/0147312 A1 * | 6/2011 | Cunnien | ............ | G01N 30/8693 210/85 |
| 2011/0174063 A1 * | 7/2011 | Liu | ........................ | G01N 30/96 422/256 |
| 2018/0065089 A1 | 3/2018 | Dasgupta et al. | | |
| 2023/0028078 A1 * | 1/2023 | Tanaka | ................... | B01D 61/54 |
| 2023/0194484 A1 * | 6/2023 | Kadjo | .................... | B01D 15/36 73/61.57 |
| 2024/0077461 A1 * | 3/2024 | Yonekura | ............... | G01N 30/14 |
| 2024/0133849 A1 * | 4/2024 | Sengupta | ............... | B01D 15/24 |

* cited by examiner

Primary Examiner — Lina Cordero (57) ABSTRACT

Disclosed herein are scientific instrument support systems, as well as related methods, computing devices, and computer-readable media. For example, in some embodiments, a scientific instrument support apparatus includes chromatogram logic to calculate the square of a retention time and a peak width variance for each of a plurality of peaks in a chromatogram; plate calculation logic to calculate an expected plate number and an observed plate number; and suppressor status logic to determine a suppressor status based on a ratio of the observed plate number to the expected plate number (O/E ratio) and to display the status.

20 Claims, 8 Drawing Sheets

SUPPRESSOR DIAGNOSTIC TOOL

BACKGROUND

Ion chromatography (IC) is a well-established analytical technique and for the past 40 years or so has been the preferred method for the determination of inorganic anions and small organic anions. IC is also used widely for the determination of inorganic cations, as well as carbohydrates and amino acids.

A suppressor may be used as one of the components in an IC system. The function of the suppressor is to reduce the background conductivity of the eluent and increase the conductivity of the analytes via the ion-exchange process, thus increasing the response in the subsequent conductivity detection. The most popular commercial suppressors are in the form of a three-channel sandwich-type design, in which the eluent channel carrying the sample is separated by two ion exchange membranes from the flanking regenerant channels carrying water stream. A flat plate electrode is placed in each of the regenerant channels. A constant current is passed between the two electrodes. The electrolysis of water in the regenerant channels produces hydrogen ions and hydroxide ions, used for the suppression of the eluent.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

DETAILED DESCRIPTION

Disclosed herein are scientific instrument support systems, as well as related methods, computing devices, and computer-readable media. For example, in some embodiments, a scientific instrument support apparatus includes chromatogram logic to calculate the square of a retention time and a peak width variance for each of a plurality of peaks in a chromatogram; plate calculation logic to calculate an expected plate number and an observed plate number; and suppressor status logic to determine a suppressor status based on a ratio of the observed plate number to the expected plate number (O/E ratio) and to display the status.

The scientific instrument support embodiments disclosed herein may achieve improved performance relative to conventional approaches. For example, the typical operator uses a single suppressor over a given period of time. The suppressor slowly degrades over time until the end of its lifetime. However, the end of life is often perceived by the operator as abrupt as the operator is unable to assess the gradual degradation over the suppressor's lifetime. The embodiments disclosed herein provides a way for the operator to monitor the suppressor's performance over time and even plan the replacement within a given time period. The embodiments disclosed herein thus provide improvements to scientific instrument technology (e.g., improvements in the computer technology supporting such scientific instruments, among other improvements).

Various ones of the embodiments disclosed herein may improve upon conventional approaches to achieve the technical advantages of reduced instrument downtime by assessing the degradation of the suppressor over time allowing the replacement to be planned rather than abrupt. Such technical advantages are not achievable by routine and conventional approaches, and all users of systems including such embodiments may benefit from these advantages (e.g., by assisting the user in the performance of a technical task, such as replacement of the suppressor, by means of a guided human-machine interaction process). The technical features of the embodiments disclosed herein are thus decidedly unconventional in the field of ion chromatography, as are the combinations of the features of the embodiments disclosed herein. The computational and user interface features disclosed herein do not only involve the collection and comparison of information but apply new analytical and technical techniques to guide the user to change the suppressor. The present disclosure thus introduces functionality that neither a conventional computing device, nor a human, could perform.

Accordingly, the embodiments of the present disclosure may serve any of a number of technical purposes, such as controlling a specific technical system or process or determining from measurements how to control a machine. In particular, the present disclosure provides technical solutions to technical problems, including but not limited to monitoring of suppressor degradation and anticipation of suppressor failure. This allows the user to plan replacement of the suppressor prior to failure, reducing downtime. Further, as monitoring of the suppressor degradation provides data driven information about the state of the suppressor, the early replacement of suppressors, based on time or number of analyses performed may be reduced. That is monitoring of the suppressor degradation as described herein can both reduce unplanned downtime and waste.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the subject matter disclosed herein. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrases "A and/or B" and "A or B" mean (A), (B), or (A and B). For the purposes of the present disclosure, the phrases "A, B, and/or C" and "A, B, or C" mean (A), (B), (C), (A and B), (A and C), (B and C), or (A, B, and C). Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices. As used herein, the phrase "based on" should be understood to mean "based at least in part on," unless otherwise specified.

The description uses the phrases "an embodiment," "various embodiments," and "some embodiments," each of which may refer to one or more of the same or different embodiments. Furthermore, the terms "comprising," "including," "having," and the like, as used with respect to embodiments of the present disclosure, are synonymous. When used to describe a range of dimensions, the phrase "between X and Y" represents a range that includes X and Y. As used herein, an "apparatus" may refer to any individual device, collection of devices, part of a device, or collections of parts of devices. The drawings are not necessarily to scale.

Figure 1:
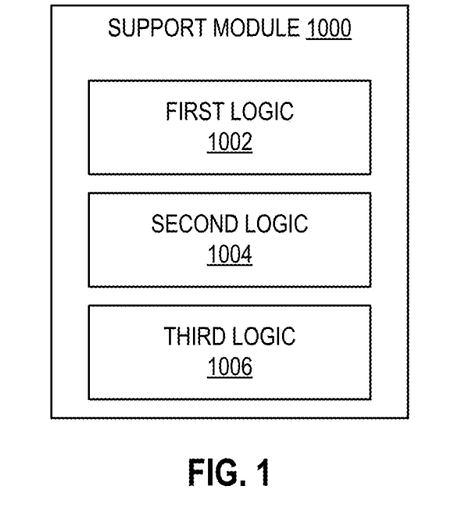
FIG. 1 is a block diagram of an example scientific instrument support module for performing support operations, in accordance with various embodiments.

FIG. 1 is a block diagram of a scientific instrument support module 1000 for performing support operations, in accordance with various embodiments. The scientific instrument support module 1000 may be implemented by circuitry (e.g., including electrical and/or optical components), such as a programmed computing device. The logic of the scientific instrument support module 1000 may be included in a single computing device, or may be distributed across multiple computing devices that are in communication with each other as appropriate. Examples of computing devices that may, singly or in combination, implement the scientific instrument support module 1000 are discussed herein with reference to the computing device 4000 of FIG. 4, and examples of systems of interconnected computing devices, in which the scientific instrument support module 1000 may be implemented across one or more of the computing devices, is discussed herein with reference to the scientific instrument support system 5000 of FIG. 5.

The scientific instrument support module 1000 may include first logic 1002, second logic 1004, and third logic 1006. As used herein, the term "logic" may include an apparatus that is to perform a set of operations associated with the logic. For example, any of the logic elements included in the support module 1000 may be implemented by one or more computing devices programmed with instructions to cause one or more processing devices of the computing devices to perform the associated set of operations. In a particular embodiment, a logic element may include one or more non-transitory computer-readable media having instructions thereon that, when executed by one or more processing devices of one or more computing devices, cause the one or more computing devices to perform the associated set of operations. As used herein, the term "module" may refer to a collection of one or more logic elements that, together, perform a function associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices. A module may not include all of the logic elements depicted in the associated drawing; for example, a module may include a subset of the logic elements depicted in the associated drawing when that module is to perform a subset of the operations discussed herein with reference to that module.

The first logic 1002 may determine retention time and peak width variance for a chromatogram. In various embodiments, the first logic 1002 can obtain a chromatogram, obtain retention time and peak width for a plurality of peaks in the chromatogram, and calculate the square of the retention time ($t_r^2$) and the peak width variance ($\sigma^2$). In various embodiments, the peak width can be the width measured at half the maximum peak intensity.

The second logic 1004 may determine the ratio of observed plate number to the expected plate number. In various embodiments, the second logic 1004 can select peaks of interest. The peaks of interest can be homologous peaks that interact similarly with the column. For example, the peaks of interest can be selected by selecting a set of 3 or more peaks where the coefficient of determination ($R^2$) of the selected peaks is at least about 0.9, such as at least about 0.99, even at least about 0.995 up to about 1.0. The second logic can then calculate the expected plate number ($N_{exp}$) and the observed plate number ($N_{obs}$). The expected plate number can be determined from the slope from fitting the $t_r^2$ vs $\sigma^2$ of the peaks of interest while forcing a 0,0 intercept. The observed plate number can be calculated using $t_r^2/\sigma^2$ for the first eluting peak from the selected peaks. Once the observed and expected plate numbers are calculated, the O/E ratio can be calculated as $N_{obs}/N_{exp}$.

The third logic 1006 may determine a status of the suppressor and provide a notification to the user. In various embodiments, the third logic 1006 can determine the status based on the O/E ratio. When the O/E ratio is low, the third logic 1006 can determine that the suppressor is in a failure state and notify the user that the suppressor should be replaced. When the O/E ratio is high, the third logic 1006 can determine that the suppressor is in a normal operating state. The third logic 1006 can determine an intermediate state and indicate that the user should consider replacing or prepare to replace the suppressor such as by ordering a replacement suppressor when the O/E ratio has an intermediate value between a low and high value. For example, when the suppressor can be in a normal operating state when the O/E ratio is above 0.7 and the suppressor can be in a failure state and need to be replaced when the O/E ratio is below 0.5. When the O/E ratio is between 0.5 and 0.7, the suppressor can be in an intermediate state and the user should consider replacement. In various embodiments, the third logic 1006 can estimate a remaining life, such as time or number of samples, for the suppressor and provide the operator with a countdown. In some embodiments, the remaining life can be estimated using a O/E ratio history of the suppressor to determine how quickly the O/E ratio is approaching the failure state threshold.

Figure 2:
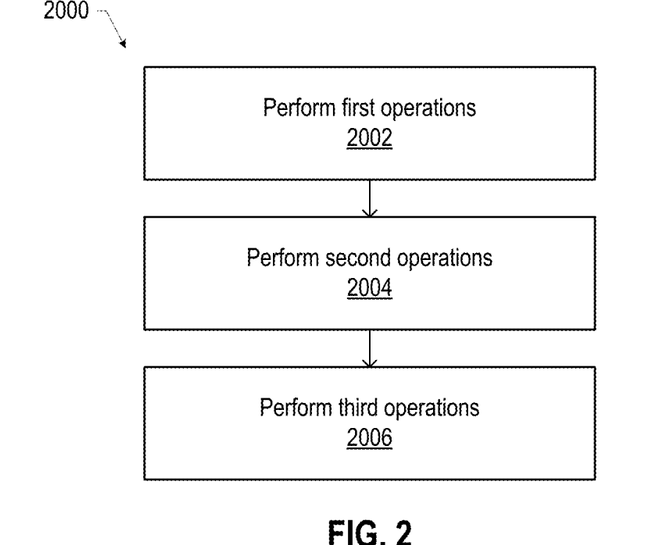
FIG. 2 is a flow diagram of an example method of performing support operations, in accordance with various embodiments.

FIG. 2 is a flow diagram of a method 2000 of performing support operations, in accordance with various embodiments. Although the operations of the method 2000 may be illustrated with reference to particular embodiments disclosed herein (e.g., the scientific instrument support modules 1000 discussed herein with reference to FIG. 1, the GUI 3000 discussed herein with reference to FIG. 3, the computing devices 4000 discussed herein with reference to FIG. 4, and/or the scientific instrument support system 5000 discussed herein with reference to FIG. 5), the method 2000 may be used in any suitable setting to perform any suitable support operations. Operations are illustrated once each and in a particular order in FIG. 2, but the operations may be reordered and/or repeated as desired and appropriate (e.g., different operations performed may be performed in parallel, as suitable).

At 2002, first operations may be performed. For example, the first logic 1002 of a support module 1000 may perform the operations of 2002. The first operations may include obtaining a chromatogram, obtaining retention times and peak widths for a plurality of peaks in the chromatogram, and calculating the square of the retention time ($t_r^2$) and the peak width variance ($\sigma^2$).

At 2004, second operations may be performed. For example, the second logic 1004 of a support module 1000 may perform the operations of 2004. The second operations may include selecting peaks of interest, calculating the expected plate number ($N_{exp}$) and the observed plate number ($N_{obs}$), and calculating the O/E ratio ($N_{obs}/N_{exp}$)

At 2006, third operations may be performed. For example, the third logic 1006 of a support module 1000 may perform the operations of 2006. The third operations may include determining a status of the suppressor based on the O/E ratio and providing a notification to the user. The third operations can also provide the user with an estimate a remaining life of the suppressor.

Figure 4:
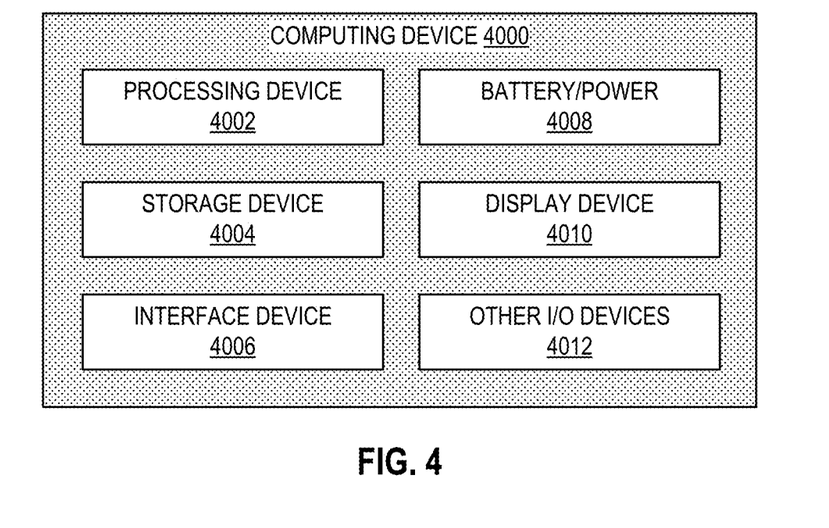
FIG. 4 is a block diagram of an example computing device that may perform some or all of the scientific instrument support methods disclosed herein, in accordance with various embodiments.
Figure 5:
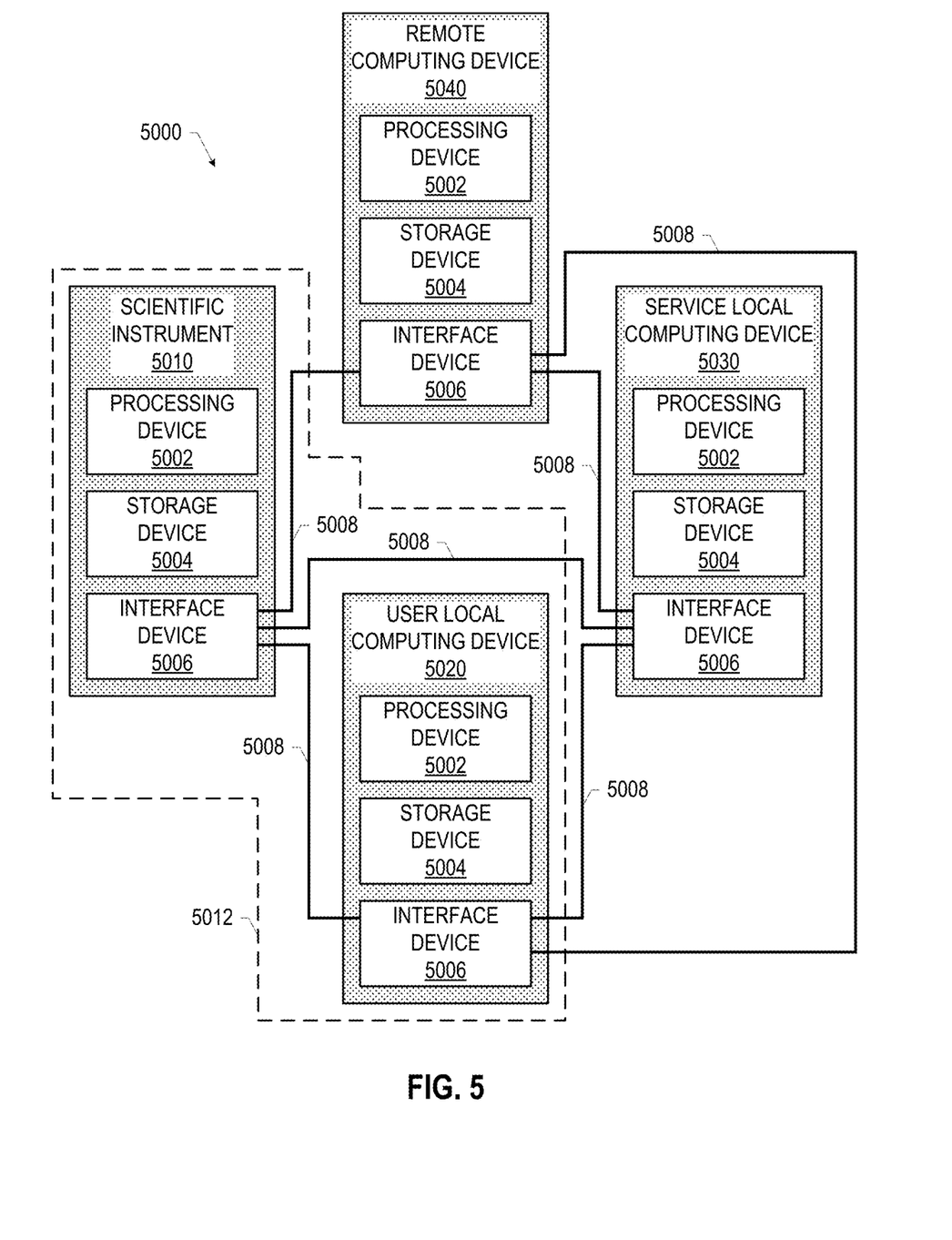
FIG. 5 is a block diagram of an example scientific instrument support system in which some or all of the scientific instrument support methods disclosed herein may be performed, in accordance with various embodiments.

The scientific instrument support methods disclosed herein may include interactions with a human user (e.g., via the user local computing device 5020 discussed herein with reference to FIG. 5). These interactions may include providing information to the user (e.g., information regarding the operation of a scientific instrument such as the scientific instrument 5010 of FIG. 5, information regarding a sample being analyzed or other test or measurement performed by a scientific instrument, information retrieved from a local or remote database, or other information) or providing an option for a user to input commands (e.g., to control the operation of a scientific instrument such as the scientific instrument 5010 of FIG. 5, or to control the analysis of data generated by a scientific instrument), queries (e.g., to a local or remote database), or other information. In some embodiments, these interactions may be performed through a graphical user interface (GUI) that includes a visual display on a display device (e.g., the display device 4010 discussed herein with reference to FIG. 4) that provides outputs to the user and/or prompts the user to provide inputs (e.g., via one or more input devices, such as a keyboard, mouse, trackpad, or touchscreen, included in the other I/O devices 4012 discussed herein with reference to FIG. 4). The scientific instrument support systems disclosed herein may include any suitable GUIs for interaction with a user.

Figure 3:
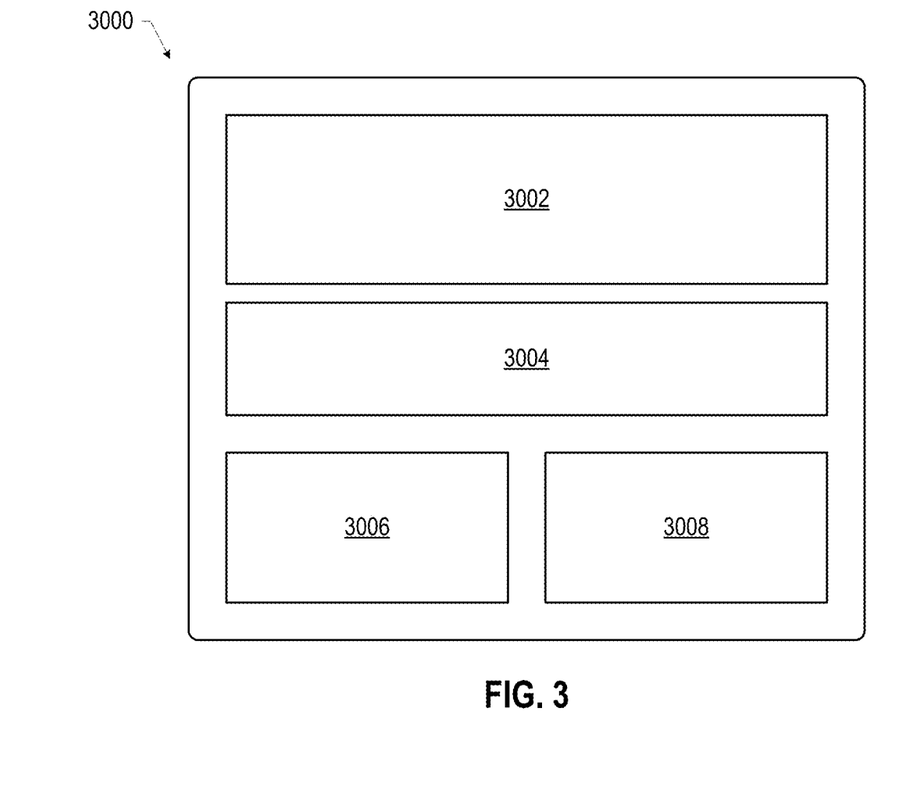
FIG. 3 is an example of a graphical user interface that may be used in the performance of some or all of the support methods disclosed herein, in accordance with various embodiments.

FIG. 3 depicts an example GUI 3000 that may be used in the performance of some or all of the support methods disclosed herein, in accordance with various embodiments. As noted above, the GUI 3000 may be provided on a display device (e.g., the display device 4010 discussed herein with reference to FIG. 4) of a computing device (e.g., the computing device 4000 discussed herein with reference to FIG. 4) of a scientific instrument support system (e.g., the scientific instrument support system 5000 discussed herein with reference to FIG. 5), and a user may interact with the GUI 3000 using any suitable input device (e.g., any of the input devices included in the other I/O devices 4012 discussed herein with reference to FIG. 4) and input technique (e.g., movement of a cursor, motion capture, facial recognition, gesture detection, voice recognition, actuation of buttons, etc.).

The GUI 3000 may include a data display region 3002, a data analysis region 3004, a scientific instrument control region 3006, and a settings region 3008. The particular number and arrangement of regions depicted in FIG. 3 is simply illustrative, and any number and arrangement of regions, including any desired features, may be included in a GUI 3000.

The data display region 3002 may display data generated by a scientific instrument (e.g., the scientific instrument 5010 discussed herein with reference to FIG. 5). For example, the data display region 3002 may display a chromatogram.

The data analysis region 3004 may display the results of data analysis (e.g., the results of analyzing the data illustrated in the data display region 3002 and/or other data). For example, the data analysis region 3004 may display retention times, peak heights, and peak widths for peaks identified from the chromatogram. In various embodiments, the data analysis region 3004 may also include an indication of the status of the suppressor. The indication of the status of the suppressor may be a simple green/yellow/red indicator. In various embodiments, the status indicator may also include an indicator of the estimated time to failure status, particularly if the status is in the yellow/intermediate state. In some embodiments, the data display region 3002 and the data analysis region 3004 may be combined in the GUI 3000 (e.g., to include data output from a scientific instrument, and some analysis of the data, in a common graph or region).

The scientific instrument control region 3006 may include options that allow the user to control a scientific instrument (e.g., the scientific instrument 5010 discussed herein with reference to FIG. 5). For example, the scientific instrument control region 3006 may include settings for flow rate, gradient, and other operating parameters of the scientific instrument.

The settings region 3008 may include options that allow the user to control the features and functions of the GUI 3000 (and/or other GUIs) and/or perform common computing operations with respect to the data display region 3002 and data analysis region 3004 (e.g., saving data on a storage device, such as the storage device 4004 discussed herein with reference to FIG. 4, sending data to another user, labeling data, etc.).

As noted above, the scientific instrument support module 1000 may be implemented by one or more computing devices. FIG. 4 is a block diagram of a computing device 4000 that may perform some or all of the scientific instrument support methods disclosed herein, in accordance with various embodiments. In some embodiments, the scientific instrument support module 1000 may be implemented by a single computing device 4000 or by multiple computing devices 4000. Further, as discussed below, a computing device 4000 (or multiple computing devices 4000) that implements the scientific instrument support module 1000 may be part of one or more of the scientific instrument 5010, the user local computing device 5020, the service local computing device 5030, or the remote computing device 5040 of FIG. 5.

The computing device 4000 of FIG. 4 is illustrated as having a number of components, but any one or more of these components may be omitted or duplicated, as suitable for the application and setting. In some embodiments, some or all of the components included in the computing device 4000 may be attached to one or more motherboards and enclosed in a housing (e.g., including plastic, metal, and/or other materials). In some embodiments, some these components may be fabricated onto a single system-on-a-chip (SoC) (e.g., an SoC may include one or more processing devices 4002 and one or more storage devices 4004). Additionally, in various embodiments, the computing device 4000 may not include one or more of the components illustrated in FIG. 4, but may include interface circuitry (not shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 4000 may not include a display device 4010, but may include display device interface circuitry (e.g., a connector and driver circuitry) to which a display device 4010 may be coupled.

The computing device 4000 may include a processing device 4002 (e.g., one or more processing devices). As used herein, the term "processing device" may refer to any device or portion of a device that processes electronic data from registers and/or memory to transform that electronic data into other electronic data that may be stored in registers and/or memory. The processing device 4002 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 4000 may include a storage device 4004 (e.g., one or more storage devices). The storage device 4004 may include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 4004 may include memory that shares a die with a processing device 4002. In such an embodiment, the memory may be used as cache memory and may include embedded dynamic random access memory (eDRAM) or spin transfer torque magnetic random access memory (STT-MRAM), for example. In some embodiments, the storage device 4004 may include non-transitory computer readable media having instructions thereon that, when executed by one or more processing devices (e.g., the processing device 4002), cause the computing device 4000 to perform any appropriate ones of or portions of the methods disclosed herein.

The computing device 4000 may include an interface device 4006 (e.g., one or more interface devices 4006). The interface device 4006 may include one or more communication chips, connectors, and/or other hardware and software to govern communications between the computing device 4000 and other computing devices. For example, the interface device 4006 may include circuitry for managing wireless communications for the transfer of data to and from the computing device 4000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. Circuitry included in the interface device 4006 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). In some embodiments, circuitry included in the interface device 4006 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 4006 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 4006 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 4006 may include one or more antennas (e.g., one or more antenna arrays) to receipt and/or transmission of wireless communications.

In some embodiments, the interface device 4006 may include circuitry for managing wired communications, such as electrical, optical, or any other suitable communication protocols. For example, the interface device 4006 may include circuitry to support communications in accordance with Ethernet technologies. In some embodiments, the interface device 4006 may support both wireless and wired communication, and/or may support multiple wired communication protocols and/or multiple wireless communication protocols. For example, a first set of circuitry of the interface device 4006 may be dedicated to shorter-range wireless communications such as Wi-Fi or Bluetooth, and a second set of circuitry of the interface device 4006 may be dedicated to longer-range wireless communications such as global positioning system (GPS), EDGE, GPRS, CDMA, WiMAX, LTE, EV-DO, or others. In some embodiments, a first set of circuitry of the interface device 4006 may be dedicated to wireless communications, and a second set of circuitry of the interface device 4006 may be dedicated to wired communications.

The computing device 4000 may include battery/power circuitry 4008. The battery/power circuitry 4008 may include one or more energy storage devices (e.g., batteries or capacitors) and/or circuitry for coupling components of the computing device 4000 to an energy source separate from the computing device 4000 (e.g., AC line power).

The computing device 4000 may include a display device 4010 (e.g., multiple display devices). The display device 4010 may include any visual indicators, such as a heads-up display, a computer monitor, a projector, a touchscreen display, a liquid crystal display (LCD), a light-emitting diode display, or a flat panel display.

The computing device 4000 may include other input/output (I/O) devices 4012. The other I/O devices 4012 may include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 4000, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 4000 may have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra mobile personal computer, etc.), a desktop computing device, or a server computing device or other networked computing component.

One or more computing devices implementing any of the scientific instrument support modules or methods disclosed herein may be part of a scientific instrument support system. FIG. 5 is a block diagram of an example scientific instrument support system 5000 in which some or all of the scientific instrument support methods disclosed herein may be performed, in accordance with various embodiments. The scientific instrument support modules and methods disclosed herein (e.g., the scientific instrument support module 1000 of FIG. 1 and the method 2000 of FIG. 2) may be implemented by one or more of the scientific instrument 5010, the user local computing device 5020, the service local computing device 5030, or the remote computing device 5040 of the scientific instrument support system 5000.

Any of the scientific instrument 5010, the user local computing device 5020, the service local computing device 5030, or the remote computing device 5040 may include any of the embodiments of the computing device 4000 discussed herein with reference to FIG. 4, and any of the scientific instrument 5010, the user local computing device 5020, the service local computing device 5030, or the remote computing device 5040 may take the form of any appropriate ones of the embodiments of the computing device 4000 discussed herein with reference to FIG. 4.

The scientific instrument 5010, the user local computing device 5020, the service local computing device 5030, or the remote computing device 5040 may each include a processing device 5002, a storage device 5004, and an interface device 5006. The processing device 5002 may take any suitable form, including the form of any of the processing devices 4002 discussed herein with reference to FIG. 4, and the processing devices 5002 included in different ones of the scientific instrument 5010, the user local computing device 5020, the service local computing device 5030, or the remote computing device 5040 may take the same form or different forms. The storage device 5004 may take any suitable form, including the form of any of the storage devices 4004 discussed herein with reference to FIG. 4, and the storage devices 5004 included in different ones of the scientific instrument 5010, the user local computing device 5020, the service local computing device 5030, or the remote computing device 5040 may take the same form or different forms. The interface device 5006 may take any suitable form, including the form of any of the interface devices 4006 discussed herein with reference to FIG. 4, and the interface devices 5006 included in different ones of the scientific instrument 5010, the user local computing device 5020, the service local computing device 5030, or the remote computing device 5040 may take the same form or different forms.

The scientific instrument 5010, the user local computing device 5020, the service local computing device 5030, and the remote computing device 5040 may be in communication with other elements of the scientific instrument support system 5000 via communication pathways 5008. The communication pathways 5008 may communicatively couple the interface devices 5006 of different ones of the elements of the scientific instrument support system 5000, as shown, and may be wired or wireless communication pathways (e.g., in accordance with any of the communication techniques discussed herein with reference to the interface devices 4006 of the computing device 4000 of FIG. 4). The particular scientific instrument support system 5000 depicted in FIG. 5 includes communication pathways between each pair of the scientific instrument 5010, the user local computing device 5020, the service local computing device 5030, and the remote computing device 5040, but this "fully connected" implementation is simply illustrative, and in various embodiments, various ones of the communication pathways 5008 may be absent. For example, in some embodiments, a service local computing device 5030 may not have a direct communication pathway 5008 between its interface device 5006 and the interface device 5006 of the scientific instrument 5010, but may instead communicate with the scientific instrument 5010 via the communication pathway 5008 between the service local computing device 5030 and the user local computing device 5020 and the communication pathway 5008 between the user local computing device 5020 and the scientific instrument 5010.

Figure 7:
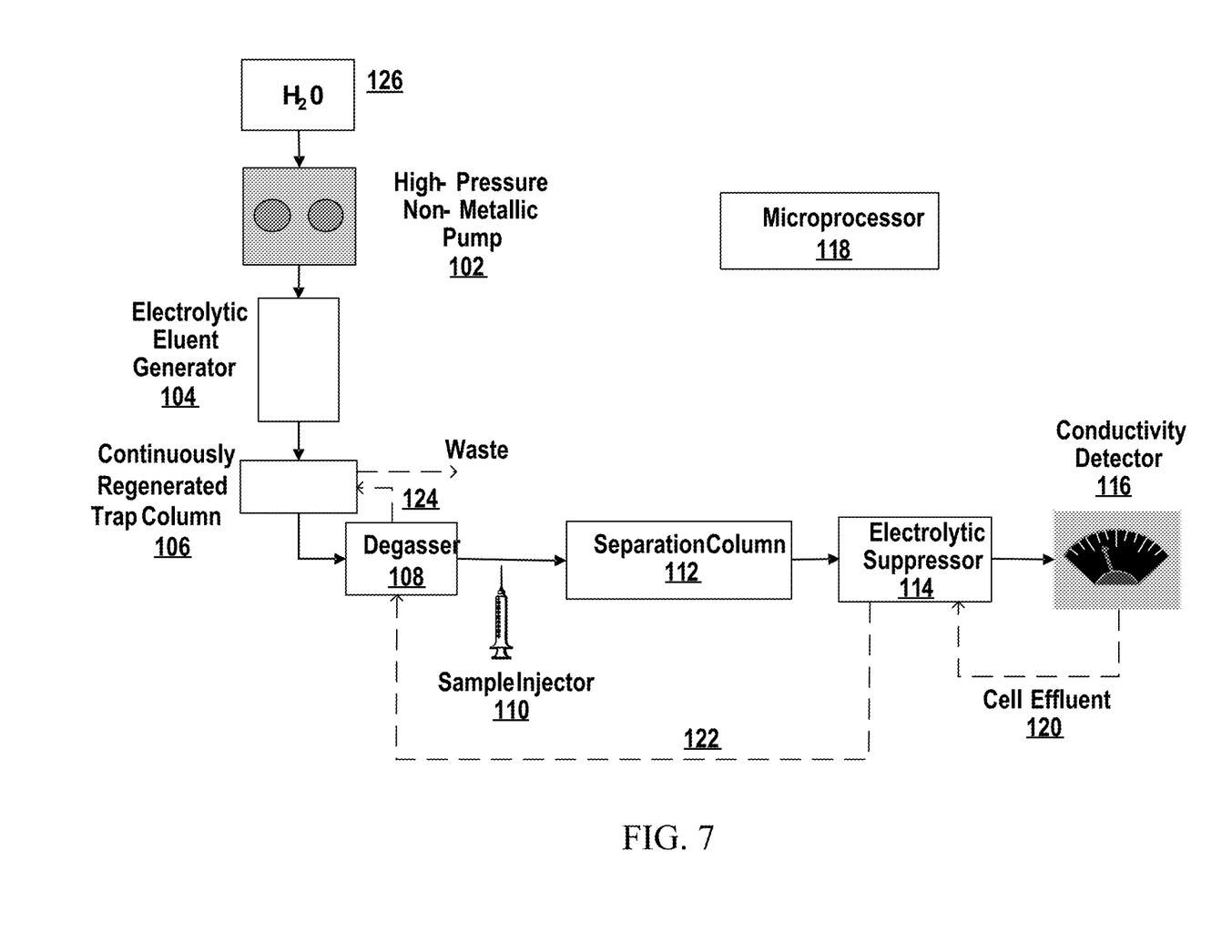
FIG. 7 is a diagram of a chromatography system that includes an electrolytic suppressor, in accordance with various embodiments.

The scientific instrument 5010 may include any appropriate scientific instrument, such as an ion chromatography system as described in FIG. 7.

The user local computing device 5020 may be a computing device (e.g., in accordance with any of the embodiments of the computing device 4000 discussed herein) that is local to a user of the scientific instrument 5010. In some embodiments, the user local computing device 5020 may also be local to the scientific instrument 5010, but this need not be the case; for example, a user local computing device 5020 that is in a user's home or office may be remote from, but in communication with, the scientific instrument 5010 so that the user may use the user local computing device 5020 to control and/or access data from the scientific instrument 5010. In some embodiments, the user local computing device 5020 may be a laptop, smartphone, or tablet device. In some embodiments the user local computing device 5020 may be a portable computing device. In some embodiments, the user local computing device 5020 may determine the status of the suppressor and provide an indication of the status to the user.

The service local computing device 5030 may be a computing device (e.g., in accordance with any of the embodiments of the computing device 4000 discussed herein) that is local to an entity that services the scientific instrument 5010. For example, the service local computing device 5030 may be local to a manufacturer of the scientific instrument 5010 or to a third-party service company. In some embodiments, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to receive data regarding the operation of the scientific instrument 5010, the user local computing device 5020, and/or the remote computing device 5040 (e.g., the results of self-tests of the scientific instrument 5010, calibration coefficients used by the scientific instrument 5010, the measurements of sensors associated with the scientific instrument 5010, etc.). In some embodiments, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to transmit data to the scientific instrument 5010, the user local computing device 5020, and/or the remote computing device 5040 (e.g., to update programmed instructions, such as firmware, in the scientific instrument 5010, to initiate the performance of test or calibration sequences in the scientific instrument 5010, to update programmed instructions, such as software, in the user local computing device 5020 or the remote computing device 5040, etc.). A user of the scientific instrument 5010 may utilize the scientific instrument 5010 or the user local computing device 5020 to communicate with the service local computing device 5030 to report a problem with the scientific instrument 5010 or the user local computing device 5020, to request a visit from a technician to improve the operation of the scientific instrument 5010, to order consumables or replacement parts associated with the scientific instrument 5010, or for other purposes. The service local computing device 5030 may determine the status of the suppressor and provide an indication of the status to the user.

The remote computing device 5040 may be a computing device (e.g., in accordance with any of the embodiments of the computing device 4000 discussed herein) that is remote from the scientific instrument 5010 and/or from the user local computing device 5020. In some embodiments, the remote computing device 5040 may be included in a datacenter or other large-scale server environment. In some embodiments, the remote computing device 5040 may include network-attached storage (e.g., as part of the storage device 5004). The remote computing device 5040 may store data generated by the scientific instrument 5010, perform analyses of the data generated by the scientific instrument 5010 (e.g., in accordance with programmed instructions), facilitate communication between the user local computing device 5020 and the scientific instrument 5010, and/or facilitate communication between the service local computing device 5030 and the scientific instrument 5010. The remote computing device may determine the status of the suppressor and provide an indication of the status to the user.

In some embodiments, one or more of the elements of the scientific instrument support system 5000 illustrated in FIG. 5 may not be present. Further, in some embodiments, multiple ones of various ones of the elements of the scientific instrument support system 5000 of FIG. 5 may be present. For example, a scientific instrument support system 5000 may include multiple user local computing devices 5020 (e.g., different user local computing devices 5020 associated with different users or in different locations). In another example, a scientific instrument support system 5000 may include multiple scientific instruments 5010, all in communication with service local computing device 5030 and/or a remote computing device 5040; in such an embodiment, the service local computing device 5030 may monitor these multiple scientific instruments 5010, and the service local computing device 5030 may cause updates or other information may be "broadcast" to multiple scientific instruments 5010 at the same time. Different ones of the scientific instruments 5010 in a scientific instrument support system 5000 may be located close to one another (e.g., in the same room) or farther from one another (e.g., on different floors of a building, in different buildings, in different cities, etc.). In some embodiments, a scientific instrument 5010 may be connected to an Internet-of-Things (IoT) stack that allows for command and control of the scientific instrument 5010 through a web-based application, a virtual or augmented reality application, a mobile application, and/or a desktop application. Any of these applications may be accessed by a user operating the user local computing device 5020 in communication with the scientific instrument 5010 by the intervening remote computing device 5040. In some embodiments, a scientific instrument 5010 may be sold by the manufacturer along with one or more associated user local computing devices 5020 as part of a local scientific instrument computing unit 5012.

In some embodiments, different ones of the scientific instruments 5010 included in a scientific instrument support system 5000 may be different types of scientific instruments 5010; for example, one scientific instrument 5010 may be an ion chromatography system, while another scientific instrument 5010 may be an ion chromatography mass spectrometry system. In some such embodiments, the remote computing device 5040 and/or the user local computing device 5020 may combine data from different types of scientific instruments 5010 included in a scientific instrument support system 5000.

Figure 6:
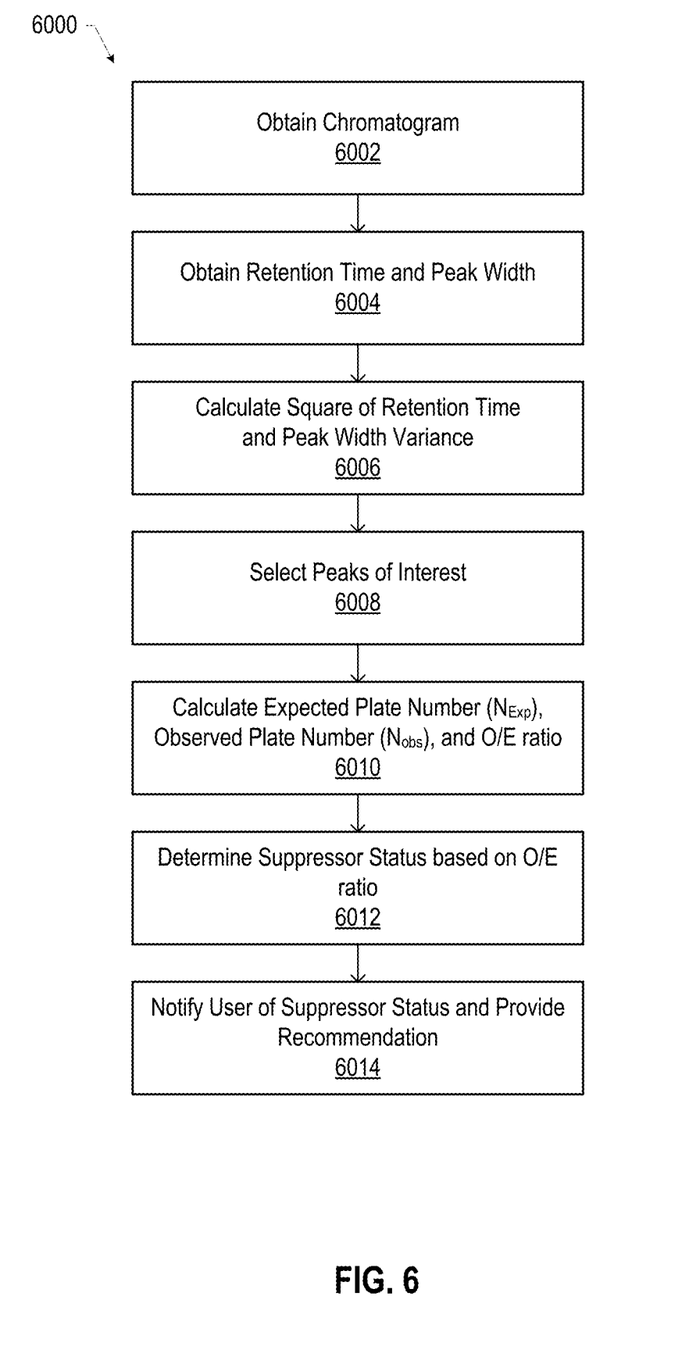
FIG. 6 is a flow diagram of an example method of determining the status of a suppressor, in accordance with various embodiments.

FIG. 6 is a flow diagram of a method 6000 of determining the status of a suppressor, in accordance with various embodiments. At 6002 a chromatogram can be obtained. In various embodiments, the chromatogram can be obtained by instructing a scientific instrument to perform an analysis of a sample or standard. In other embodiments, the chromatogram can be from a previously performed analysis and the chromatogram can be retrieved from a data storage. At 6004, retention time and peak width for a plurality of peaks in the chromatogram can be obtained. In various embodiments, a peak detection algorithm can identify the peaks and determine the retention time and intensity. Further analysis of the peaks can determine the peak widths, such as by determining the width measured at half the maximum peak intensity. In other embodiments, the chromatogram can be previously analyzed for retention time and peak width and the data can be retrieved from storage. At 6006, the square of the retention time ($t_r^2$) and the peak width variance ($\sigma^2$) can be calculated.

At 6008, peaks of interest can be selected. The peaks of interest can be homologous peaks that interact similarly with the column. For example, the peaks of interest can be selected by selecting a set of 3 or more peaks where the coefficient of determination ($R^2$) of the selected peaks is at least about 0.9, such as at least about 0.99, even at least about 0.995 up to about 1.0. At 6010, the expected plate number ($N_{exp}$) and the observed plate number ($N_{obs}$) can be calculated. The expected plate number can be determined from the slope from fitting the $t_r^2$ vs $\sigma^2$ of the peaks of interest while forcing a 0,0 intercept. The observed plate number can be calculated by $t_r^2/\sigma^2$ for the first eluting peak from the selected peaks. Once the observed and expected plate numbers are calculated, the O/E ratio can be calculated as $N_{obs}/N_{exp}$.

At 6012 a status of the suppressor can be determined based on the O/E ratio. A low O/E ratio, such as below 0.5, can indicate a failure state while a high O/E ratio, such as above 0.7, can indicate a normal operating state. An intermediate value, such as between 0.5 and 0.7 can indicate a suppressor that is approaching a failure state, but still operating within acceptable parameters. At 6014, a user can be notified of the status of the suppressor. For example, an indicator may show green when the suppressor is in a normal operating state, red when the suppressor is in a failure state, and yellow when the suppressor is in an intermediate state. In other embodiments, a message, such as an email, a SMS message, a push notification, or the like can be sent to the user when the suppressor is in the failure state. Additionally, when the suppressor is determined to be in a failure state, further operation can be paused to prevent wasting samples and reagents.

FIG. 7 illustrates an embodiment of a chromatography system. Chromatography system may include a pump 102, an electrolytic eluent generator 104, a continuously regenerated trap column 106, a degasser 108, a sample injector 110, a chromatographic separation column 112, an electrolytic suppressor 114, a detector 116, and a microprocessor 118. Chromatographic separation column 112 may be in the form of a capillary column or an analytical column. A recycle line 120 may be used to transfer the liquid from an output of detector 116 to an inlet of the electrolytic suppressor 114, recycle line 122 may be used to transfer liquid from an outlet of electrolytic suppressor 114 to an inlet of degasser 108, and recycle line 124 may be used to transfer liquid from an outlet of degasser 108 to an inlet of continuously regenerated trap column 106.

Pump 102 can be configured to pump a liquid from a liquid source 126 and be fluidically connected to electrolytic eluent generator 104. In an embodiment, the liquid may be deionized water, an aqueous solution with electrolyte(s), or a mixture of an organic solvent with deionized water or with aqueous electrolyte(s) solution. A few example electrolytes are sodium acetate and acetic acid. The eluent mixture that contains an organic solvent may include a water miscible organic solvent such as, for example, methanol. Pump 102 can be configured to transport the liquid at a pressure ranging from about 20 PSI to about 15,000 PSI. Under certain circumstances, pressures greater than 15,000 PSI may also be implemented. It should be noted that the pressures denoted herein are listed relative to an ambient pressure (13.7 PSI to 15.2 PSI). Pump 102 may be in the form of a high-pressure liquid chromatography (HPLC) pump. In addition, pump 102 can also be configured so that the liquid only touches an inert portion of pump 102 so that a significant amount of impurities does not leach out. In this context, significant means an amount of impurities that would interfere with the intended measurement. For example, the inert portion can be made of polyetherether ketone (PEEK) or at least coated with a PEEK lining, which does not leach out a significant number of ions when exposed to a liquid.

An eluent is a liquid that contains an acid, base, salt, or mixture thereof and can be used to elute an analyte through a chromatography column. In addition, an eluent can include a mixture of a liquid and a water miscible organic solvent, where the liquid may include an acid, base, salt, or combination thereof. Electrolytic eluent generator 104 is configured to generate a generant. A generant refers to a particular species of acid, base, or salt that can be added to the eluent. In an embodiment, the generant may be a base such as cation hydroxide or the generant may be an acid such as carbonic acid, phosphoric acid, acetic acid, methanesulfonic acid, or a combination thereof.

Referring to FIG. 7, eluent generator 104 can be configured to receive the liquid from pump 102 and then add a generant to the liquid. The liquid containing the generant can be outputted from eluent generator 104 to an inlet of continuously regenerated trap column 106.

Continuously regenerated trap column 106 is configured to remove cationic or anionic contaminants from the eluent. Continuously regenerated trap column 106 can include an ion exchange bed with an electrode at the eluent outlet. An ion exchange membrane interface can separate the eluent from a second electrode and contaminate ions can be swept through the ion exchange membrane towards the second electrode. In various embodiments, anion removal can utilize an anion exchange bed with a cathode at the eluent outlet separated from an anode by an anion exchange membrane. Alternatively, cation removal can utilize a cation exchange bed with an anode at the eluent outlet separated from a cathode by a cation exchange membrane. The contaminate ions can be swept out of regenerated trap column 106 using a recycled liquid via a recycle line 124 that is downstream of degas assembly 108.

Degasser 108 may be used to remove residual gases in eluents. In an embodiment, a residual gas may be hydrogen and oxygen. Degasser 108 may include a tubing section that is gas permeable and liquid impermeable such as, for example, amorphous fluoropolymers or more specifically Teflon AF. The flowing liquid can be outputted from degasser 108 to sample injector 110 with a substantial portion of the gas removed. The gas can be swept out of degasser 108 using a recycled liquid via a recycle line 122 that is downstream of electrolytic suppressor 114. The recycled liquid containing the residual gas can also be outputted from degasser 108 and directed to the continuously regenerated trap column 106.

Sample Injector 110 can be used to inject a bolus of a liquid sample into an eluent stream. The liquid sample may include a plurality of chemical constituents (i.e., matrix components) and one or more analytes of interest.

Chromatographic separation column 112 can be used to separate various matrix components present in the liquid sample from the analyte(s) of interest. Typically, chromatographic separation column 112 may be in the form of a hollow cylinder that contains a packed stationary phase. As the liquid sample flows through chromatographic separation column 112, the matrix components and target analytes can have a range of retention times for eluting off of chromatographic separation column 112. Depending on the characteristics of the target analytes and matrix components, they can have different affinities to the stationary phase in chromatographic separation column 112. An output of chromatographic separation column 112 can be fluidically connected to the electrolytic suppressor 114.

Electrolytic suppressor 114 can be used to reduce eluent conductivity background and enhance analyte response through efficient exchange of eluent counterions for regenerant ions. Electrolytic suppressor 114 can include an anode chamber, a cathode chamber, and an eluent suppression bed chamber separated by ion exchange membranes. The anode chamber and/or cathode chamber can produce regenerate ions. The eluent suppression bed chamber can include a flow path for the eluent separated from the regenerant by an ion exchange barrier and eluent counterions can be exchanged with regenerate ions across the ion exchange barrier. The cathode chamber or anode chamber can be supplied a recycled liquid via a recycle line 120 that is downstream of conductivity detector 116. An output of electrolytic suppressor 114 can be fluidically connected to detector 116 to measure the presence of the separated chemical constituents of the liquid sample.

As illustrated in FIG. 7, the fluidic output of the eluent from detector 116 is recycled to electrolytic suppressor 114 via recycle line 120, the fluidic output of the electrolytic suppressor 114 is recycled to degasser 108 via recycle line 122, the fluidic output from degasser 108 is recycled to continuously regenerated trap column 106 via recycle line 124, and the fluidic output of the continuously regenerated trap column 106 flows to waste.

Detector 116 may be in the form of ultraviolet-visible spectrometer, a fluorescence spectrometer, an electrochemical detector, a conductometric detector, a charge detector, or a combination thereof. Details regarding the charge detector that is based on a charged barrier and two electrodes can be found in US Pre-Grant Publication No. 20090218238, which is hereby fully incorporated by reference herein. For the situation where recycle line 120 is not needed, detector 116 may also be in the form of a mass spectrometer or a charged aerosol detector. The charged aerosol detector nebulizes the effluent flow and creates charged particles that can be measured as a current proportional to the analyte concentration. Details regarding the charged aerosol detector can be found in U.S. Pat. Nos. 6,544,484; and 6,568,245, which are hereby fully incorporated by reference herein.

An electronic circuit may include microprocessor 118, a timer, and a memory portion. In addition, the electronic circuit may include a power supply that is configured to apply a controlling signal, respectively. Microprocessor 118 can be used to control the operation of chromatography system. Microprocessor 118 may either be integrated into chromatography system or be part of a personal computer that communicates with chromatography system. Microprocessor 118 may be configured to communicate with and control one or more components of chromatography system such as pump 102, eluent generator 104, sample injector 110, and detector 116. The memory portion may be used to store instructions to set the magnitude and timing of the current waveform with respect to the switching of sample injector 110 that injects the sample.

Figure 8A:
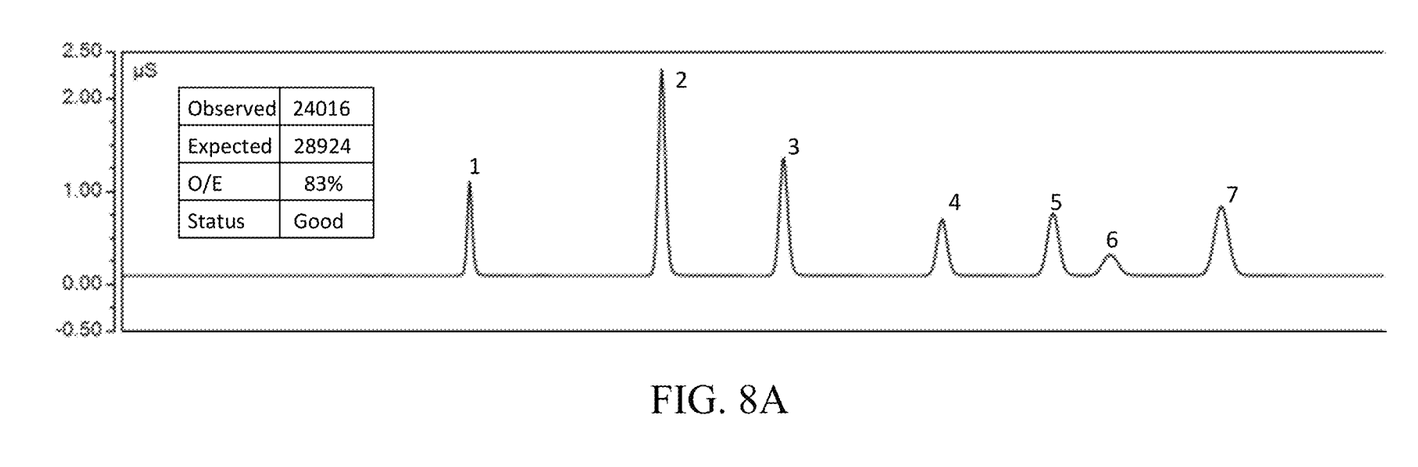
FIGS. 8A, 8B, 8C, 8D, and 8E are chromatograms illustrating various examples of suppressor states, in accordance with various embodiments.
Figure 8B:
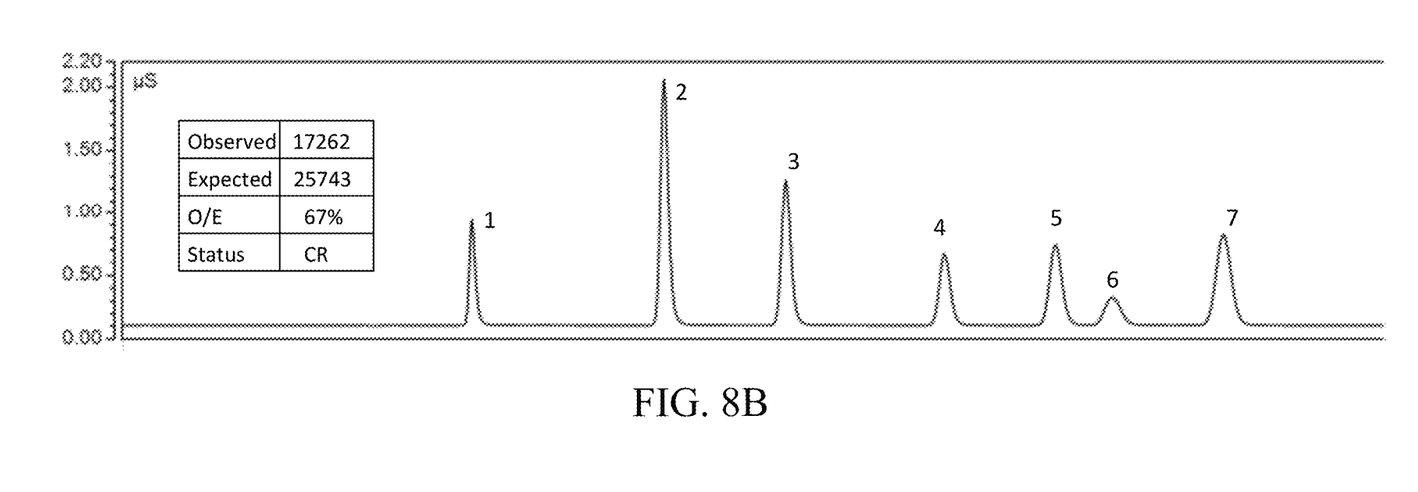
Figure 8C:
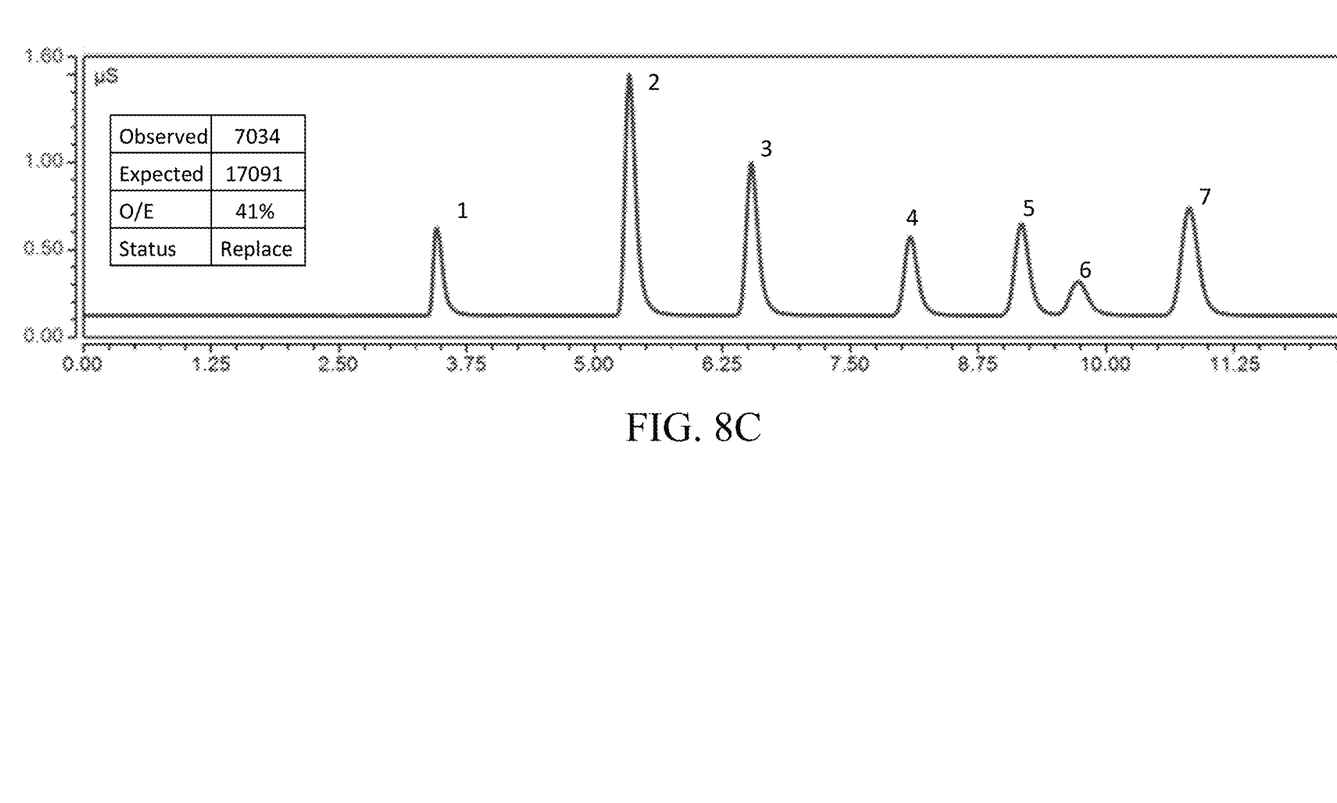

FIGS. 8A through 8E show chromatograms illustrating various states of the ion chromatography system. Each chromatogram was obtained using an Ion Pac AS19 column using 20 mM KOH eluent at a flow rate of 1 ml/min. Injected volume was 10 µl and the oven temperature was 30° C. The peaks are (1) fluoride, (2) chloride, (3) nitrite, (4) bromide, (5) nitrate, (6) carbonate, and (7) sulfate. FIG. 8A shows a good suppressor. The suppressor of FIG. 8A was "aged" by exposure to high pressure. After exposure to 500 psi, FIG. 8B shows a suppressor that is in an intermediate state where the user should consider replacing. After exposure to 1000 psi, FIG. 8C shows a suppressor that is in a failed state and should be replaced. Notably, the peaks are broadened and the tailing increases after exposure to increased pressure.

Figure 8D:
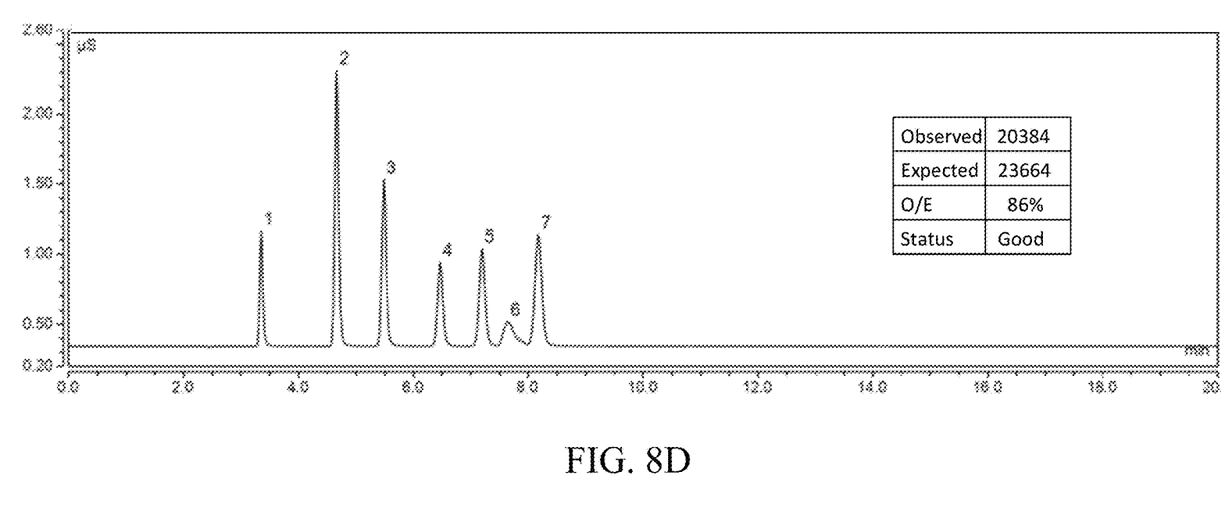
Figure 8E:
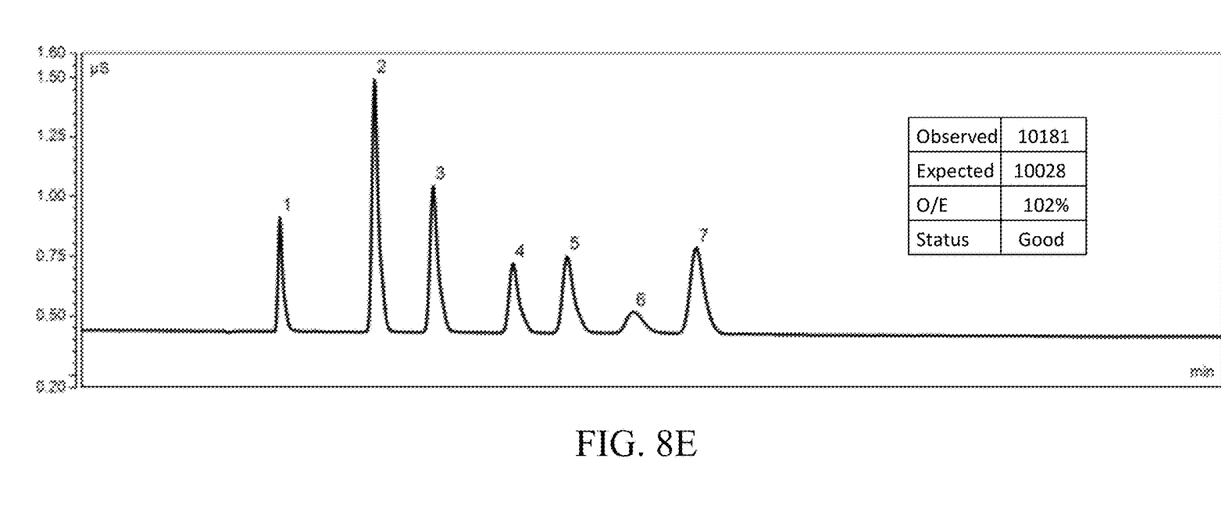

FIGS. 8D and 8E illustrate that the calculation is able to isolate the effect of a bad suppressor from the effect of a bad column. FIG. 8D shows the chromatogram produced by using a good column and a good suppressor while FIG. 8E shows the chromatogram produced using a bad column and a good suppressor. Note FIG. 8E shows broader peaks and increased tailing compared to FIG. 8D, similar to FIG. 8C. However, the O/E ratio indicates the suppressor is good, as expected.

The following paragraphs provide various examples of the embodiments disclosed herein.

Example 1 is a computing device, including a scientific instrument support apparatus, comprising:
chromatogram logic to calculate the square of a retention time and a peak width variance for each of a plurality of peaks in a chromatogram; plate calculation logic to calculate an expected plate number and an observed plate number; and suppressor status logic to determine a suppressor status based on a ratio of the observed plate number to the expected plate number (O/E ratio) and to display the status.

Example 2 may include the subject matter of Example 1, and may further specify that the chromatogram logic, the plate calculation logic, and the suppressor status logic are implemented by a common computing device.

Example 3 may include the subject matter of Example 1 or 2, and may further specify that at least one of the chromatogram logic, the plate calculation logic, and the suppressor status logic are implemented by a computing device remote from the scientific instrument.

Example 4 may include the subject matter of Example 1, 2, or 3 and may further specify that at least one of the chromatogram logic, the plate calculation logic, and the suppressor status logic are implemented by a user computing device.

Example 5 may include the subject matter of any of Examples 1-4, and may further specify that at least one of the chromatogram logic, the plate calculation logic, and the suppressor status logic are implemented in the scientific instrument.

Example 6 may include the subject matter of any of Examples 1-5, and may further specify that the chromatogram logic further includes logic to obtaining the chromatogram.

Example 7 may include the subject matter of any of Examples 1-6, and may further specify that the chromatogram logic further includes logic to identify the plurality of peaks in the chromatogram.

Example 8 may include the subject matter of any of Examples 1-7, and may further specify that the chromatogram logic further includes logic to determine the retention time and the peak width for each of the plurality of peaks in the chromatogram.

Example 9 may include the subject matter of any of Examples 1-8, and may further specify the plate calculation logic further includes logic to select peaks of interest from the plurality of peaks, wherein the peaks of interest have a coefficient of determination (R2) of at least 0.9, such as at least about 0.99, even at least about 0.995.

Example 10 may include the subject matter of any of Examples 1-9, and may further specify that the plate calculation logic further includes logic to fit a line to a square of the retention time (tr2) vs the peak width variance (σ2) of each of the peaks of interest while forcing a 0,0 intercept and to determine the slope of the line, wherein the expected number of plates is the slope of a line.

Example 11 may include the subject matter of any of Examples 1-10, and may further specify that the plate calculation logic further includes logic to determine the observed number of plates using $t_r^2/\sigma^2$ for the first eluting peak from the selected peaks.

Example 12 may include the subject matter of any of Examples 1-11, and may further specify that the suppressor status logic further includes logic to assign a normal status when the O/E ratio is above a first threshold and to assign a replace status when the O/E ratio is below a second threshold.

Example 13 may include the subject matter of any of Examples 1-12, and may further specify that the suppressor status logic further includes logic to assign a consider replacement status when the O/E ratio is between the first threshold and the second threshold.

Example 14 may include the subject matter of any of Examples 1-13, and may further specify the first threshold is about 0.7.

Example 15 may include the subject matter of any of Examples 1-14, and may further specify that the second threshold is about 0.5.

Example 16 may include the subject matter of any of Examples 1-15, and may further specify that the suppressor status logic further includes logic to display the status with a color indicator, wherein the normal status is green, the consider replacement status is yellow, and the replace status is red.

Example 17 may include the subject matter of any of Examples 1-16, and may further specify that the suppressor status logic further includes logic to display a countdown to replacement value along with the consider replacement status indicator, wherein the countdown to replacement value is an estimated time to replacement, an estimated number of samples until replacement, the O/E ratio, a difference between the O/E ratio and the second threshold, or any combination thereof.

Example 18 is a scientific instrument support apparatus, comprising: chromatogram logic first logic to receive a chromatogram from an ion chromatography system, the ion chromatography system including a suppressor; and suppressor status logic second logic to generate a status indicator for a suppressor based at least in part on the chromatogram.

Example 19 may include the subject matter of Examples 18, and may further specify that the scientific instrument support apparatus further includes a third logic to cause the outputs to be graphically represented on a display device.

Example 20 may include the subject matter of Examples 18 or 19, and may further specify that the outputs are graphically represented on the display device with a color indicator, wherein a normal status is green, a consider replacement status is yellow, and a replace status is red.

Example A includes any of the scientific instrument support modules disclosed herein.

Example B includes any of the methods disclosed herein.

Example C includes any of the GUIs disclosed herein.

Example D includes any of the scientific instrument support computing devices and systems disclosed herein.

The invention claimed is:

1. A scientific instrument support apparatus, comprising:
   chromatogram logic to calculate a square of a retention time ($t_r^2$) and a peak width variance ($\sigma^2$) for each of a plurality of peaks in a chromatogram;
   plate calculation logic to calculate an expected plate number and an observed plate number; and
   suppressor status logic to determine a suppressor status based on a ratio of the observed plate number to the expected plate number (O/E ratio) and to display the suppressor status.

2. The scientific instrument support system of claim 1, wherein the chromatogram logic, the plate calculation logic, and the suppressor status logic are implemented by a common computing device.

3. The scientific instrument support system of claim 1, wherein at least one of the chromatogram logic, the plate calculation logic, and the suppressor status logic are implemented by a computing device remote from a scientific instrument.

4. The scientific instrument support system of claim 1, wherein at least one of the chromatogram logic, the plate calculation logic, and the suppressor status logic are implemented by a user computing device.

5. The scientific instrument support system of claim 1, wherein at least one of the chromatogram logic, the plate calculation logic, and the suppressor status logic are implemented in a scientific instrument.

6. The scientific instrument support system of claim 1, wherein the chromatogram logic further includes logic to obtain the chromatogram.

7. The scientific instrument support system of claim 1, wherein the chromatogram logic further includes logic to identify the plurality of peaks in the chromatogram.

8. The scientific instrument support system of claim 1, wherein the chromatogram logic further includes logic to determine a retention time and a peak width for each of the plurality of peaks in the chromatogram, wherein the square of the retention time ($t_r^2$) and the peak width variance ($\sigma^2$) are calculated based on the retention time and the peak width for each of the plurality of peaks in the chromatogram.

9. The scientific instrument support system of claim 1, wherein the plate calculation logic further includes logic to select peaks of interest from the plurality of peaks, wherein the peaks of interest have a coefficient of determination ($R^2$) of at least 0.9.

10. The scientific instrument support system of claim 9, wherein the plate calculation logic further includes logic to fit a line to the square of the retention time ($t_r^2$) and the peak width variance ($\sigma^2$) of each of the selected peaks of interest while forcing a 0,0 intercept and to determine a slope of the line, wherein the expected plate number is the slope of the line.

11. The scientific instrument support system of claim 9, wherein the plate calculation logic further includes logic to determine the observed plate number using $t_r^2/\sigma^2$ for a first eluting peak from the selected peaks of interest.

12. The scientific instrument support system of claim 1, wherein the suppressor status logic further includes logic to assign a normal status when the O/E ratio is above a first threshold and to assign a replace status when the O/E ratio is below a second threshold.

13. The scientific instrument support system of claim 12, wherein the suppressor status logic further includes logic to assign a consider replacement status when the O/E ratio is between the first threshold and the second threshold.

14. The scientific instrument support system of claim 13, wherein the suppressor status logic further includes logic to display a countdown to replacement value along with the consider replacement status, wherein the countdown to replacement value is an estimated time to replacement, an estimated number of samples until replacement, the O/E ratio, a difference between the O/E ratio and the second threshold, or any combination thereof.

15. The scientific instrument support system of claim 12, wherein the first threshold is 0.7.

16. The scientific instrument support system of claim 12, wherein the second threshold is 0.5.

17. The scientific instrument support system of claim 13, wherein the suppressor status logic further includes logic to display the suppressor status with a color indicator, wherein the normal status is green, the consider replacement status is yellow, and the replace status is red.

18. A scientific instrument support apparatus, comprising:
chromatogram logic to receive a chromatogram from an ion chromatography system, the ion chromatography system including a suppressor; and
suppressor status logic to generate a status indicator for the suppressor based at least in part on the chromatogram.

19. The scientific instrument support apparatus of claim 18, further comprising:
third logic to cause outputs to be graphically represented on a display device.

20. The scientific instrument support apparatus of claim 19, wherein the outputs are graphically represented on the display device with a color indicator, wherein a normal status is green, a consider replacement status is yellow, and a replace status is red.

* * * * *